(12) United States Patent
Mitsuhashi (10) Patent No.: US 6,262,414 B1
(45) Date of Patent: Jul. 17, 2001

(54) OPTICAL PROBE

(75) Inventor: Yoshinobu Mitsuhashi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/362,652

(22) Filed: Jul. 27, 1999

(30) Foreign Application Priority Data

Jul. 28, 1998 (JP) .................................. 10-212678

(51) Int. Cl.⁷ ................ G11B 7/00; G11B 7/12
(52) U.S. Cl. ........................ 250/216; 250/227.24
(58) Field of Search ............................ 250/216, 234, 250/235, 236, 306, 307, 227.11, 227.24, 227.26, 227.28; 359/642, 656, 722, 738, 894; 369/44.11, 44.24, 112, 126; 347/258

(56) References Cited

U.S. PATENT DOCUMENTS

| | | |
|---|---|---|
| 5,286,971 | 2/1994 | Betzig et al. . |
| 5,294,790 | * 3/1994 | Ohta et al. ............... 250/216 |
| 5,767,891 | * 6/1998 | Hirokane et al. ........... 347/258 |
| 6,101,165 | * 8/2000 | Korogi et al. ............. 369/126 |

FOREIGN PATENT DOCUMENTS

| | | |
|---|---|---|
| 61-9846 | 1/1986 | (JP) . |
| 7-254185 | 10/1995 | (JP) . |
| 9-198830 | 7/1997 | (JP) . |

* cited by examiner

Primary Examiner—John R. Lee
(74) Attorney, Agent, or Firm—Merchant & Gould P.C.

(57) ABSTRACT

An optical probe includes a rod-shaped microlens provided with a refractive index distribution in a radial direction, and an evanescent light generating portion formed on a first end face of said microlens. The refractive index distribution and the length of said microlens are such that parallel light that enters said microlens through the second end face converges while being transmitted through said microlens, and substantially focuses on the first end face. The evanescent light generating portion comprises a light-blocking film, which is provided with a micro-aperture formed substantially on an optical axis of the microlens. An aperture diameter of the micro-aperture is dimensioned such that the light transmitted through the microlens is leaked from the microlens as evanescent light only. Outside the micro-aperture, the light transmitted through the microlens is reflected or absorbed by the light-blocking film. It is also possible to use a planar microlens instead of the rod-shaped microlens. With this optical probe, it is possible to make the incident light energy large, the transmission losses small, the generation efficiency of evanescent light can be made high. The optical probe can be manufactured easily, and control of its positioning are easy.

15 Claims, 8 Drawing Sheets

FIG. 2 evacuation system

OPTICAL PROBE

BACKGROUND OF THE INVENTION

1. Field of the Invention

The present invention relates to an optical probe and a method of manufacturing the same, used for the super-high density recording known as "near-field optical recording" or "evanescent light recording" with an information recording device, such as an optical disk system. More specifically, the present invention relates to an optical probe using a microlens on one surface of which an evanescent-light-generating portion is formed, that is made of a light-blocking film with a micro-aperture.

2. Description of the Prior Art

One super-high density recording method for optical disk systems is known as "near-field optical recording" or "evanescent light recording", using evanescent light. Evanescent light is different from regular emitted light (travelling through free space) in that it is a surface wave that exists only near interfaces of two media with different refractive indices (and decays rapidly with growing distance from that interface). If a micro-aperture having a diameter that is not greater than the wavelength of the incident light is formed at the interface of two media with different refractive indices, evanescent light leaking into a near-field from the microaperture can be observed. If the near-field is not free space and another object is placed in it, then the evanescent light couples and starts to transmit energy. Applying this technology to information recording devices, it is possible to avoid diffraction, and to irradiate light with high density onto the recording medium.

A conventional technology for near-field optical recording that has been suggested uses an optical fiber probe, wherein the tip of the optical fiber is tapered extremely thin to make a tip with an aperture whose diameter is smaller than the wavelength of the incident light, and a metal film is deposited on the tapered portion (see for example U.S. Pat. No. 5,286,971). Another conventional technology, disclosed by Publication of Unexamined Japanese Patent Application (Tokkai Hei) JP-A-7-254185, is an optical head using an optical fiber probe, wherein the core portion of the fiber is made gradually thinner, and wherein the optical fiber and an air slider are formed in one piece.

Moreover, JP-A-9-198830 discloses forming a tiny tapered through hole in a slider, and directly irradiating light into the larger aperture without using an optical fiber probe, thereby generating a near-field leaking from the smaller aperture. Recently, other similar and related technologies have been reported by a number of publications.

The biggest problem with near-field optical recording is that the evanescent light leaking from the micro-aperture is extremely weak. The ratio between the energy leaking as evanescent light and the optical energy irradiated into the aperture, called "radiation efficiency", is only about 0.00001–0.0001. In other words, only an optical energy that is less than $\frac{1}{1000}$ of the irradiation energy can be used for interaction with the optical recording medium. Consequently, there is the problem that a high-power laser has to be used, or that the optical recording speed is slow if a low-power laser is used.

To perform optical recording with a micro-aperture, a large optical energy is necessary, and it is important to have a high radiation efficiency. How high a radiation efficiency can be attained depends on the shape of the micro-aperture, the material properties, and the interaction with the optical recording medium, but many parts of the theory are still unclear, and there is a lot of research involving simulations based on Maxwell's equations. For example, light is reflected and transmitted at the metal film of the tapered portion of the optical fiber probe, and reaches the micro-aperture, but losses due to optical absorption at the metal film are still large.

The problem of optical fiber probes is that the core portion of optical fibers, which transmits the optical energy, is very small with a diameter of about 5 $\mu$m, and that there is a limit for increasing the incident energy. If the incident optical energy is increased, the optical energy per area, i.e. the optical energy density increases, which can cause damage to the incident end face of the optical fiber. Another problem with optical fiber probes is that they use optical fibers that have been made very thin, and due to their pliable character, the control of their position with respect to the optical recording medium, an aspect that is indispensable when using them for optical recording, are difficult.

To form a tiny tapered through-hole directly in the slider involves a very difficult manufacturing process, and if the size of this micro-aperture varies, the entire slider has to be exchanged. Also, as in the case of optical fiber probes, there is the problem that it is not possible to introduce the optical power of a high-power laser because the hole diameter on the incident side is small. Moreover, since the light transmission is performed by reflection from the wall surfaces of the tapered through hole, the losses are large.

SUMMARY OF THE INVENTION

It is an object of the present invention to provide an optical probe, into which a large energy can be irradiated, which has low transmission loss, whose radiation efficiency is large, which can be manufactured easily, which can be easily kept in a certain position, and whose positioning control can be performed easily. It is another object of the present invention to provide a method for manufacturing an optical probe provided with a micro-aperture on its optical axis that can be performed easily and accurately. It is yet another object of the present invention to provide an optical head and an optical pickup that are suitable for near-field optical recording systems.

An optical probe in accordance with the present invention comprises a rod-shaped microlens having first and second end faces, which is provided with a refractive index distribution in a radial direction, and an evanescent light generating portion formed on the first end face of the microlens. Throughout this specification, "refractive index distribution" refers to a distribution of the refractive index, wherein the refractive index changes depending on the position. In the optical probe in accordance with the present invention, the refractive index distribution and the length of the microlens are such that parallel light that enters the microlens through the second end face converges while being transmitted through the microlens, and substantially focuses on the first end face. The evanescent light generating portion comprises a light-blocking film deposited on the first end face, which is provided with a micro-aperture formed substantially on an optical axis of the microlens. The aperture diameter of the micro-aperture is dimensioned such that the light transmitted through the microlens is leaked from the microlens substantially as evanescent light. Outside the micro-aperture, the light transmitted through the microlens is reflected or absorbed by the light-blocking film. A miniature lightweight lens of, for example, not more than about 0.2 mm diameter can be used for the rod-shaped microlens.

There is no particular limitation regarding the diameter of the rod-shaped microlens, but a diameter of at least 0.05 mm is preferable.

Another optical probe in accordance with the present invention comprises a planar microlens having first and second surfaces, which comprises a lens portion formed at a surface of a transparent substrate, the lens portion having a substantially semi-circular cross-section, and an evanescent light generating portion formed on the first surface of the planar microlens. The lens portion and the substrate thickness of the planar microlens are such that parallel light that enters the transparent substrate from the second surface converges while being transmitted through the microlens, and substantially focuses on the first surface. The evanescent light generating portion comprises a light-blocking film deposited on a substrate surface, which is provided with a micro-aperture formed substantially on an optical axis of the microlens. The aperture diameter of the micro-aperture is such that the light transmitted through the microlens is leaked from the microlens substantially as evanescent light. Outside the micro-aperture, the light transmitted through the microlens is reflected or absorbed by the light-blocking film. With this configuration, an optical probe is formed that generates evanescent light from a plurality of locations by using a planar microlens array, wherein a plurality of lens portions are formed in a transparent substrate, and forming micro-apertures substantially on the optical lens axis of these lens portions. It is preferable that the lens portion is formed inside the substrate, and has a substantially semi-circular cross-section with a convex portion facing into the substrate, or that the lens portion is formed on the substrate, and has a substantially semi-circular cross-section with a convex portion facing away from the substrate.

It is preferable that the light-blocking film is selected from the group consisting of metal films, alloy films, metal-carbon films, and dielectric multi-layer films. It is preferable that the light-blocking film has a film thickness between 20 nm and 50 nm. It is preferable that the aperture diameter of the micro-aperture is smaller than the wavelength of the used light, so that only evanescent light is leaked. It is even more preferable that the aperture diameter of the micro-aperture is not more than half the wavelength of the parallel light. The wavelength of the used light is selected so that it can be transmitted through the lens material (for example, glass or transparent resin), and can be, for example, at least 0.25 μm and at most 0.8 μm. It is preferable that the diameter of the micro-aperture is not more than 200 nm. If the micro-aperture is too small, the transmission efficiency decreases. Therefore, it is preferable that the diameter of the micro-aperture is at least 80 nm.

DESCRIPTION OF THE PREFERRED EMBODIMENTS

When rod-shaped microlenses are used, usually, both end faces of the lens are planar, but it is also possible to uses lenses wherein one or both end faces are spherical. To make the end face of a slim rod-shaped microlens spherical requires difficult processing steps, but with spherical faces, the numerical aperture NA can be increased.

An optical probe in accordance with the present invention can be manufactured by the following method: A light-blocking film is provided on one surface of a microlens. Then, high-power laser light is irradiated from the other side to dissolve, evaporate, or ablate a central portion of the light-blocking film on the optical axis with the transmitted and focused laser light, thereby producing a micro-aperture in the light-blocking film on the optical axis of the microlens.

Alternatively, an optical probe in accordance with the present invention also can be manufactured as follows: A light-blocking film is provided on one surface of a microlens. Then, laser light is irradiated from the other side, and a central portion of the light-blocking film on the optical axis is heated with the transmitted and focused laser light. At the same time, focused laser light or a focused ion beam is irradiated on the light-blocking film near the optical axis of the lens from the air side. The combined effect of the laser light energy from inside the microlens and the laser light energy or ion beam energy from outside the microlens dissolve, evaporate, or ablate the light-blocking film, thereby producing a micro-aperture in the light-blocking film on the optical axis of the microlens.

To make an optical head for an optical recording and reproduction device using evanescent light coupling, the gap between the evanescent light generating portion of the light probe and the recording medium should be very narrow (for example, several tens of nm). Therefore, the above optical probe should be mounted in a slider floating over the recording medium, so that the floating face and the light-blocking film are almost in the same plane. It is also useful to line up a plurality of optical probes on the same slider, spaced apart by an integer multiple of the track pitch with respect to the direction of the rotation radius of the slider.

Another embodiment of the present invention is an optical pickup using the self-coupling effect of a semiconductor laser, wherein this optical probe is mounted in opposition to an optical recording medium. This optical pickup includes an optical system that emits laser light from one end face of a semiconductor laser having two end faces, focuses the laser light on the optical recording medium, and accepts the laser light that has been reflected by the optical recording medium with the emitting end face of the semiconductor laser.

EXAMPLES

Figure 1A:
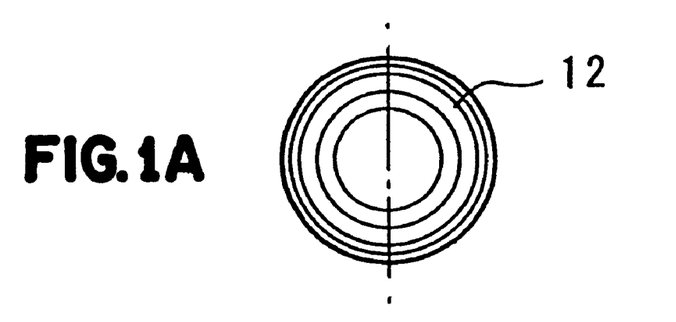
FIG. 1 is a diagram illustrating an optical probe in accordance with the present invention.
Figure 1B:
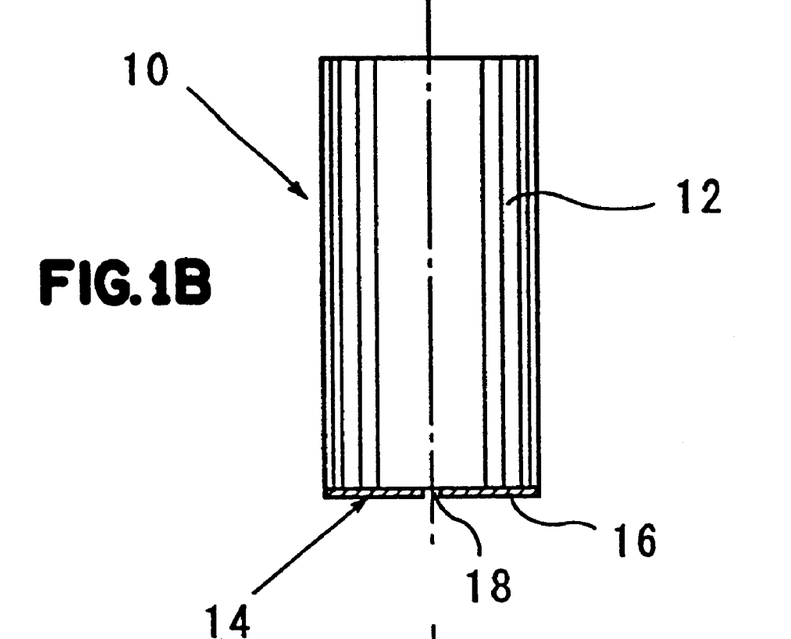
Figure 1C:
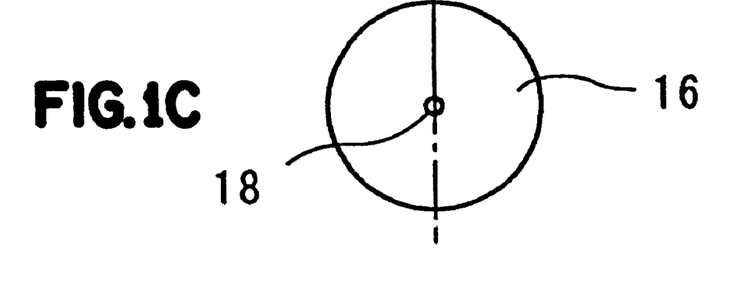

FIG. 1 is a drawing illustrating an embodiment of an optical probe in accordance with the present invention. This optical probe 10 includes a rod-shaped microlens 12 having a refractive index distribution in the radial direction, and an evanescent light generating portion 14 formed on one of its end faces. The refractive index distribution and the length of the microlens 12 are such that parallel light that enters the lens from one end face converges while being transmitted, and is substantially focused when it reaches the other end face. Its diameter can be 0.20 mm and its length can be 0.4 mm, for example. The evanescent light generating portion 14 includes a light-blocking film 16 deposited on an end face of the rod lens, and a micro-aperture 18 formed in the light-blocking film 16 near the optical axis of the lens. A metal film was formed by sputtering and was used for the light-blocking film 16.

Figure 2:
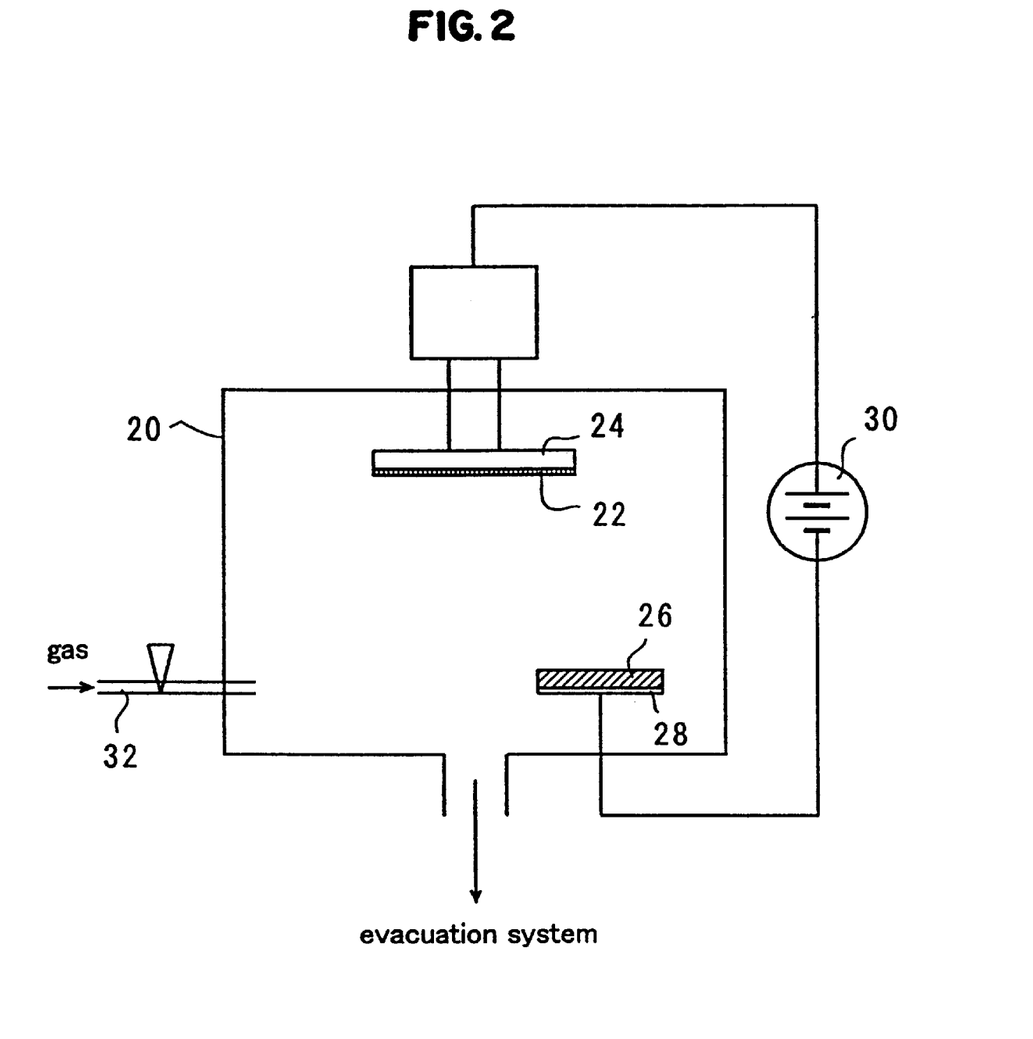
FIG. 2 is a diagram illustrating an example of a sputtering device for forming a light-blocking film on an end face of a lens.

The light-blocking film was deposited with a sputtering device as shown in FIG. 2. In this device, a rotatable microlens holder 24 for holding a multitude of microlenses 22, and a target holder 28 for holding a target material (light-blocking film material) 26 oppose each other inside a vacuum chamber 20, and a high voltage is applied with a dc current source 30 or an ac current source. The vacuum container 20 is evacuated with an evacuation system, and a predetermined gas is introduced from a gas inlet 32. The introduced gas is ionized to generate a plasma. If the target material 26 is a metal, then metal atoms are sputtered out of the target, and a metal film is deposited on the surface of the microlenses 22.

Films of metals with a high melting point, such as molybdenum (Mo) or rhodium (Rh), need to be irradiated with high laser power to produce the micro-aperture. Materials with a large reflectivity, such as silver (Ag) or gold (Au), do not absorb the laser light very well when irradiated to produce the micro-aperture and therefore also have to be irradiated with high laser power to achieve laser ablation by heat. Therefore, it is preferable not to use these metals with regard to the resultant difficulties when forming the micro-aperture. However, they may be useful film materials when the recording sensitivity of the recording medium material is low, and the optical recording has to be performed by irradiating a high laser power.

In this example, a tellurium-based material was used for the metal film material. With this material, a micro-aperture can be produced by ablation with low laser power. This material has been developed for write-once optical disk recording films. In the sputtering device in FIG. 2, $CH_4$ or a gas mixture of $CH_4$ and Ar was used for the sputtering gas, and tellurium was used was used for the target material. The vacuum inside the vacuum chamber was in the order of $10^{-3}$ mmHg, and a Te—C film was deposited on the microlenses by sputtering. The deposition speed was about 50 nm/min, and the film thickness was set to about 40 nm. By introducing $CH_4$ gas, a Te—C film can be attained, wherein the tellurium (Te) particles in the deposition film are surrounded by carbon (C). The necessary laser irradiation power for the laser ablation of this Te—C film is lower and the micro-apertures formed by laser ablation are more stable (i.e., a change of properties due to oxidization can be avoided, and it has excellent environmental resistance) than in a film consisting of Te only. Another great advantage is that the resulting micro-aperture is circular with excellent symmetry.

A metal with a large absorption coefficient in the UV range, such as Ti, can be used for the light-blocking film instead of Te. An organic material, such as a paint or pigments, that is opaque in the used wavelength range also can be used. Thus, there is no particular restriction to the material used for the light-blocking film, as long as it is possible to form a micro-aperture in it, so that the objects of the present invention can be attained.

Figure 3A:
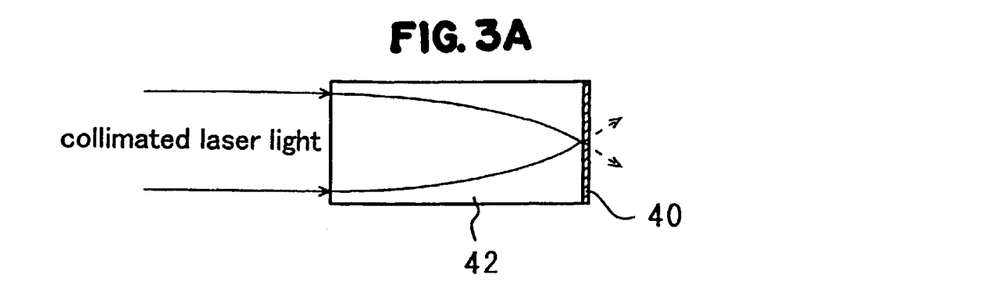
FIG. 3A is a diagram illustrating an example of a method for forming a micro-aperture.
Figure 3B:
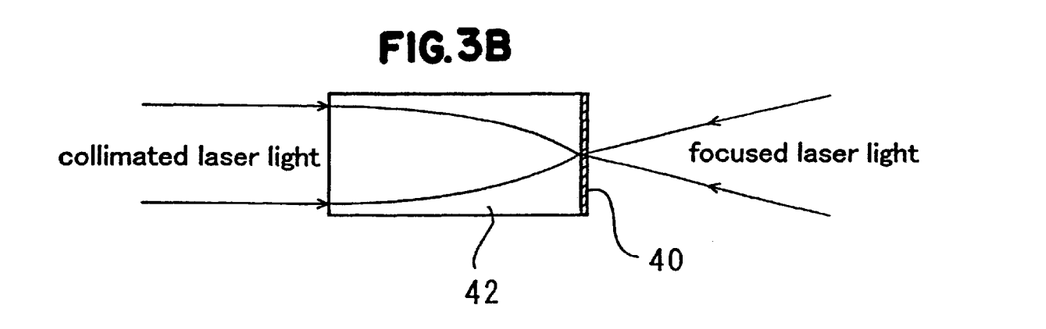
FIG. 3B is a diagram illustrating another example of a method for forming a micro-aperture.
Figure 3C:
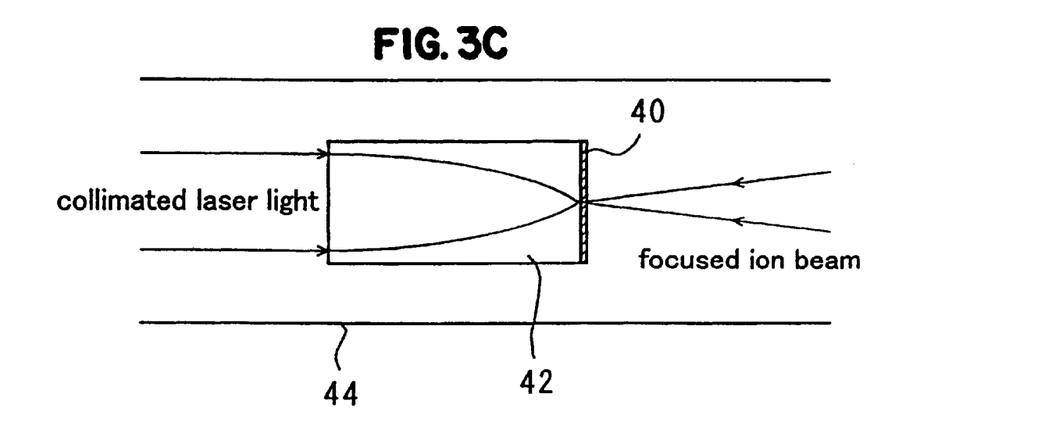
FIG. 3C is a diagram illustrating yet another example of a method for forming a micro-aperture.

Then, a micro-aperture was formed in the light-blocking film with the method illustrated in FIGS. 3A–3C. In FIG. 3 A, the central axis of a microlens 42 to which a light-blocking film 40 has been attached is set in parallel to a beam of parallel laser light, which is irradiated from the side of the microlens where the light-blocking film has not been formed. The microlens 42 has a refractive index distribution that focuses parallel light entering from one end face onto the other end face, but the light does not have to be focused completely, and it is sufficient if it is substantially focused. This focussing property changes depending on the wavelength of the laser light used, so the appropriate selections have to be made.

FIG. 3B shows how at the same time that parallel laser light enters the microlens 42 from one end face, another focused laser light beam is irradiated onto the optical axis of the microlens from outside of the end face where the light-blocking film 40 has been formed. FIG. 3C shows how inside a vacuum container 44 and at the same time that parallel laser light enters the microlens 42 from one end face, a focused ion beam is irradiated onto the optical axis of the microlens from outside of the end face where the light-blocking film 40 has been formed.

In the method illustrated in FIG. 3B, it is also possible to form the micro-aperture only by irradiating a laser beam from outside the light-blocking film of the microlens. If the wavelength used for this process is 0.8 to 1.2 times the wavelength used for the sensing with the optical probe, this method is the most useful processing method.

An argon ion laser ($Ar^+$; wavelengths: 488 nm, 458 nm, 351 nm), a helium-cadmium laser (He—Cd; wavelength: 442 nm), an excimer laser (XeF; wavelength: 350 nm), and the third harmonic of a Nd:YAG laser (wavelength: 355 nm) were used to produce the laser light entering the one end face of the microlens. To produce the micro-aperture, it is preferable to use laser light with as small a wavelength as possible, but due to the transmission spectrum of the microlens, the limit is at about 350 nm. Concerning the wavelength of the laser light irradiated from outside the other end face of the microlens (where the light-blocking film has been formed), there is no particular restriction, and it is possible to use a laser with an even shorter wavelength, such as an excimer laser (KrF; wavelength: 249 nm, ArF; wavelength: 193 nm). When an excimer laser with shorter wavelength ($F_2$; wavelength: 157 nm) or a laser emitting at so-called vacuum UV wavelengths is used, then a micro-aperture can be formed with the microlens placed in a vacuum container, as in the case of an ion beam.

Thus, when laser light enters the microlens from one end face, and, if necessary, simultaneously a focused laser beam or a focused ion beam is irradiated on the optical axis of the microlens from outside of the other end face, the energy of the laser light focussing on the light-blocking film exceeds the threshold for opening a hole in the light-blocking film by dissolution, evaporation, or ablation, so that a micro-aperture is formed. The light entering the microlens focuses onto the optical axis of the microlens, so that the location of the hole opened in the light-blocking layer is automatically positioned in the center, i.e. on the optical axis of the light-blocking layer. The diameter of the micro-aperture can be controlled with the material for the light-blocking film, the film thickness, the wavelength of the irradiated laser light, and the irradiation energy, and can be made less than 200 nm.

In a microlens on which a 40 nm Te—C film has been formed as a light-blocking film, a micro-aperture with a 160 nm diameter could be formed by irradiating once the third harmonic of a Nd: YAG laser with a wavelength of 355 nm at 0.01J from the end face of the microlens where the light-blocking film has not been formed. Moreover, in a microlens on which a 200 nm Ti film has been formed as a light-blocking film, a micro-aperture with a 200 nm diameter could be formed by irradiating once the third harmonic of a Nd: YAG laser with a wavelength of 355 nm at 0.05J from outside the microlens where the light-blocking film had been formed.

Figure 4:
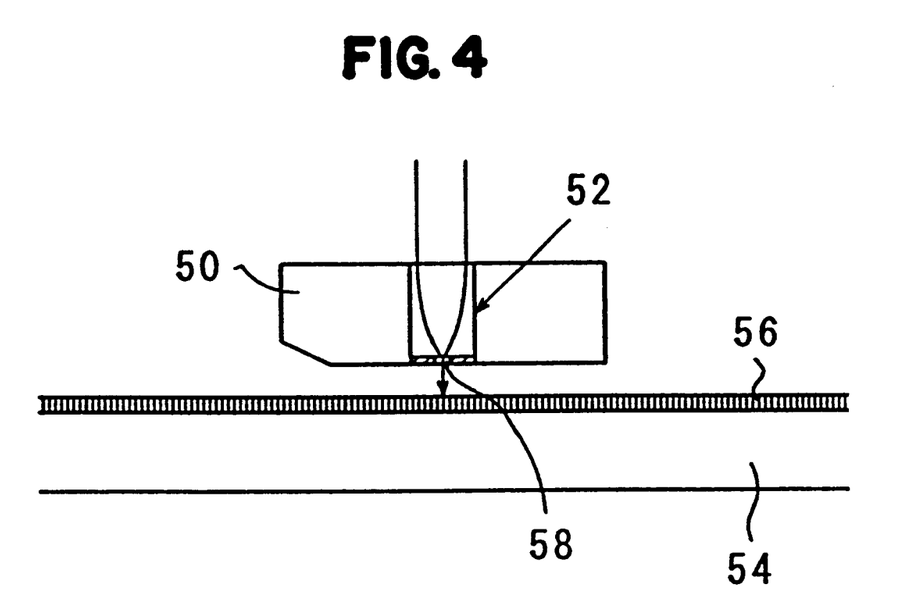
FIG. 4 is a diagram illustrating an example of an optical head in accordance with the present invention.

FIG. 4 shows an example of an optical head for an optical recording and reproduction apparatus. An optical probe 52 is mounted on a slider 50, which floats carried by the flow of air over the recording medium. The slider 50 is the same as the sliders usually used for magnetic hard-disk devices. An optical recording medium has an optical recording film 56 formed on an optical recording substrate 54. When this optical recording medium is rotated at high speeds, the distance between the micro-aperture 58 and the optical recording film 56 is kept constant due to the floating effect of the slider 50, thereby automatically achieving focus control.

Figure 5A:
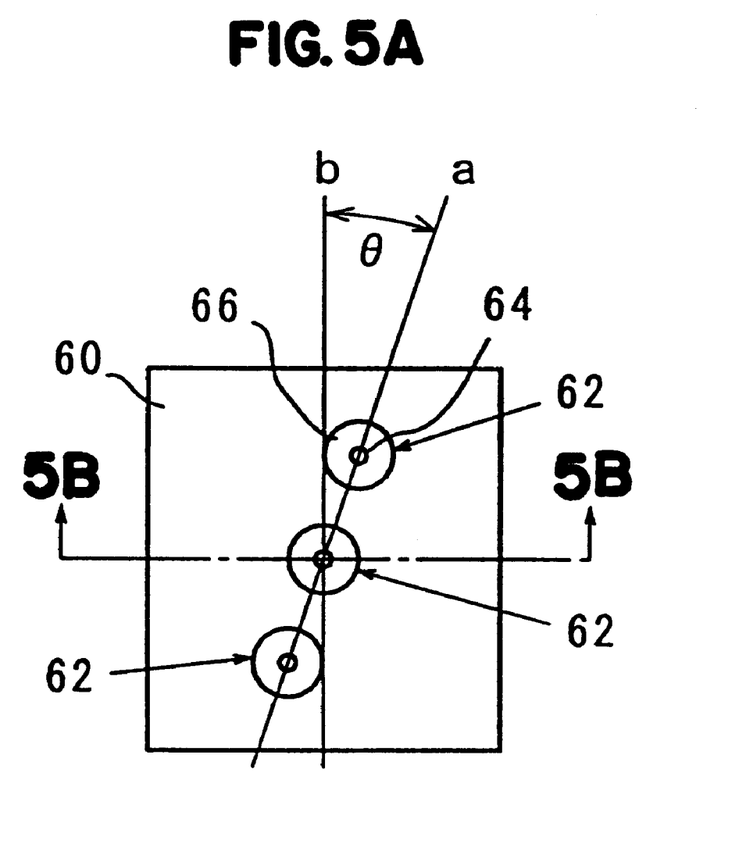
FIG. 5A is a bottom view of another example of an optical head in accordance with the present invention.
Figure 5B:
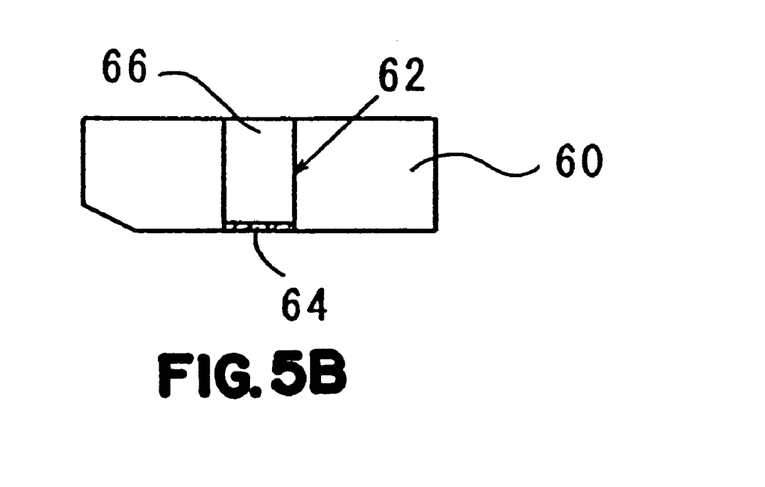
FIG. 5B is a cross-sectional view of the optical head in FIG. 5A.

FIG. 5 shows another example of an optical head for an optical recording and reproduction apparatus. FIG. 5A is a bottom plan view, and FIG. 5B is a side view along X—X in FIG. 5A, viewed in the arrow direction. A plurality (for example three) optical probes 62 are lined up in a slider 60, and the optical probes 62 are spaced apart in integer multiples of the track pitch of the optical recording medium with respect to the direction of the rotation radius of the slider. This configuration is suitable for performing parallel super-high density optical recording and reproduction with multiple tracks. For example, when the track pitch is about 200 nm, the diameter of the micro-apertures 64 of the optical probes 62 is equal or lower than that. If the diameter of the microlenses 66 is 200 $\mu$m, then the microlenses are arranged separated by the track pitch (here, 200 nm) with respect to the center line in the rotation direction of the slider arm (i.e. in the radial direction of the slider rotation). Consequently, the imaginary line "a" connecting the centers of the three microlenses 66 is tilted for an angle θ whose sin is $1/1000$ (=200 nm/200 $\mu$m) with respect to the center line "b" in the rotation direction of the slider arm. Thus, a plurality of optical probes mounted on one slider can record and reproduce a plurality of parallel tracks simultaneously.

If a planar microlens whereon a plurality (for example three) of lens portions are formed at certain positions is used instead of the rod-shaped microlenses that form the basis of the optical head in FIG. 5, and an evanescent light generating portion (light-blocking film and micro-aperture) is formed in each lens portion, then it is easy to manufacture a multi-channel optical head by integrating a single such compound optical probe into the slider.

Figure 7A:
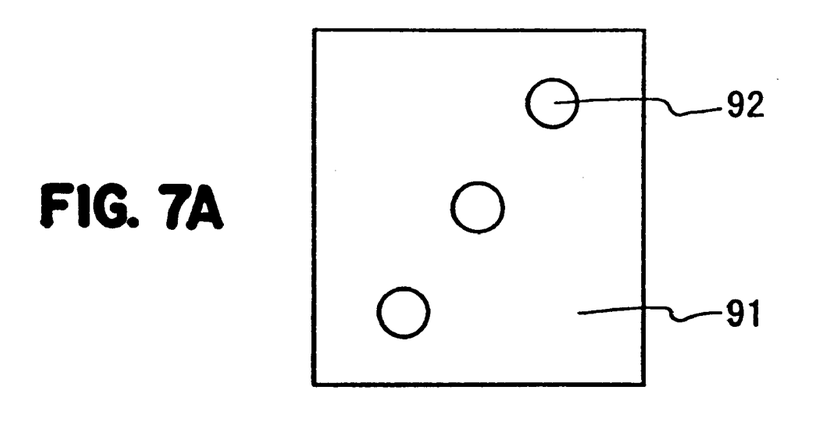
FIG. 7A is a planar view showing an example of another optical probe of the present invention.
Figure 7B:
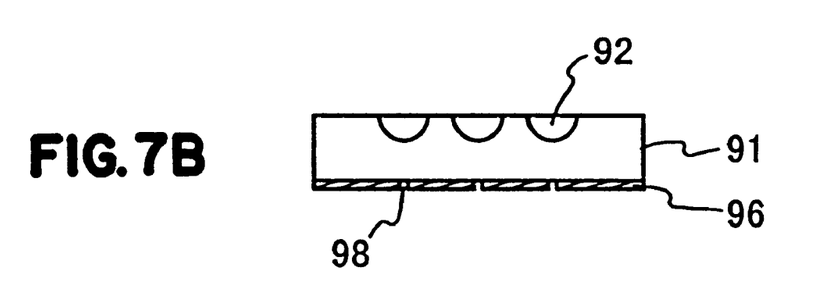
FIG. 7B shows a cross-section of this optical probe.
Figure 7C:
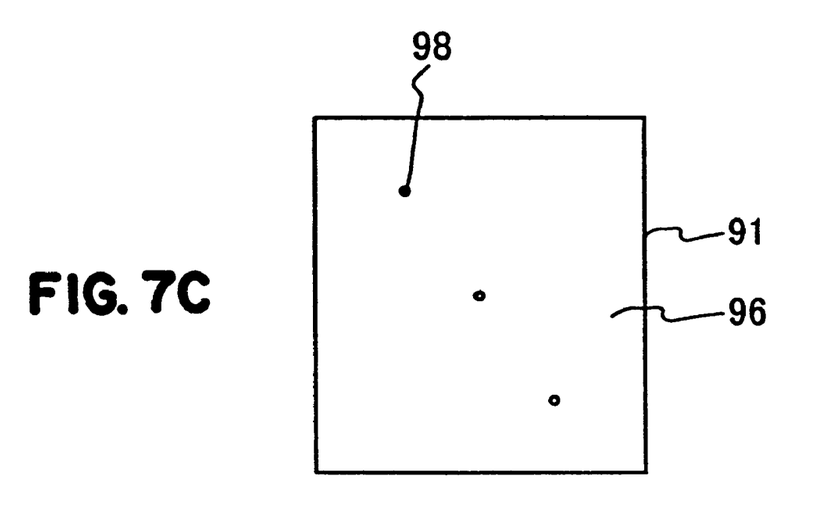
FIG. 7C is a bottom view of this optical probe.

FIG. 7 illustrates an embodiment of an optical probe using a planar microlens. As is shown in FIG. 7C, which shows a planar microlens 91 seen from below, three micro-apertures 98 are formed in the planar microlens 91. As shown in FIG. 7A, which shows a planar microlens 91 seen from above, three semi-circular lens portions 92 are formed in the planar microlens 91. As is shown in FIG. 7B, the lens portions 92 and the micro-apertures 98 are arranged in a manner that light is converged by the semi-circular lens portions 92 and focuses near the micro-apertures 98.

Figure 8:
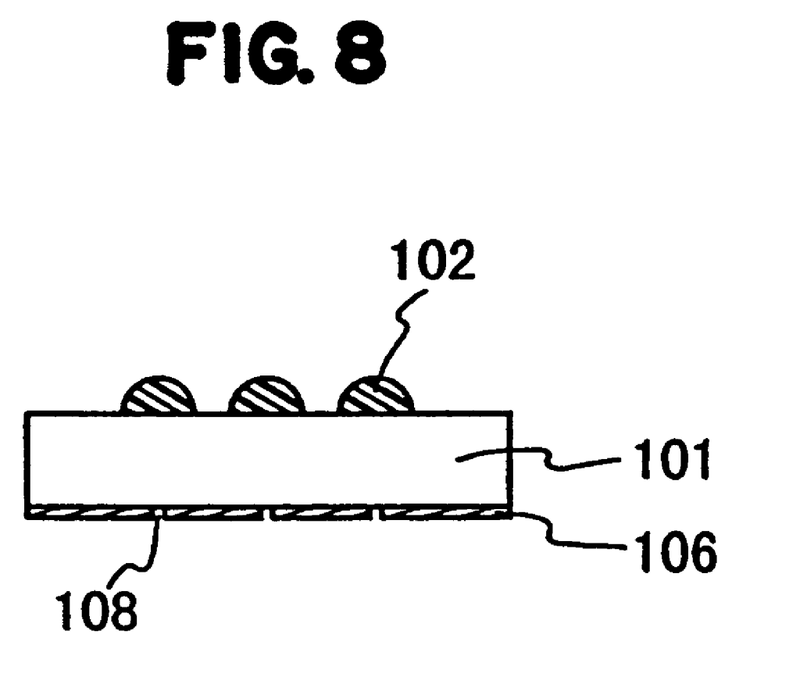
FIG. 8 is a cross-section of yet another example of an optical probe of the present invention.

There is no particular restriction regarding the method for forming the lens portions 92 of the planar microlens. Examples for such a method include covering the surface of a substrate, made of glass for example, with a mask of a predetermined pattern, and treating the surface of the substrate with ion exchange. In this method, ions are diffused into the glass from the micro-regions where the mask does not cover the substrate, and lens portions having a refractive index distribution are formed. It is also possible to cover the substrate with a mask of a predetermined pattern, etch concave portions of substantially semi-circular cross-section into the substrate, and fill the concave portions with a resin. After forming the lens portions, micro-apertures 98 are formed in the light-blocking layer, as explained above. Of course, it is also possible to form substantially semi-circular lens portions 102 made of resin on top of a substrate 101 with photo-polymerization, as shown in FIG. 8. Also in this case, as explained above, micro-apertures 108 can be formed in the light-blocking film 106.

Although there is no particular restriction, in the embodiments shown in FIGS. 7 and 8, it is preferable that the thickness of the substrates 91 and 101 is at least 50 $\mu$m and at most 650 $\mu$m (for example 250 $\mu$m), the diameter of the lens portions is at least 30 $\mu$m and at most 1000 $\mu$m (for example 300 $\mu$m), and that the lens pitch is at least 100 $\mu$m and at most 1000 $\mu$m (for example 250 $\mu$m).

If a planar microlens is used, it is possible to make a very thin optical probe. Moreover, it is also possible to form an optical probe with a plurality of channels on a single substrate.

Figure 6:
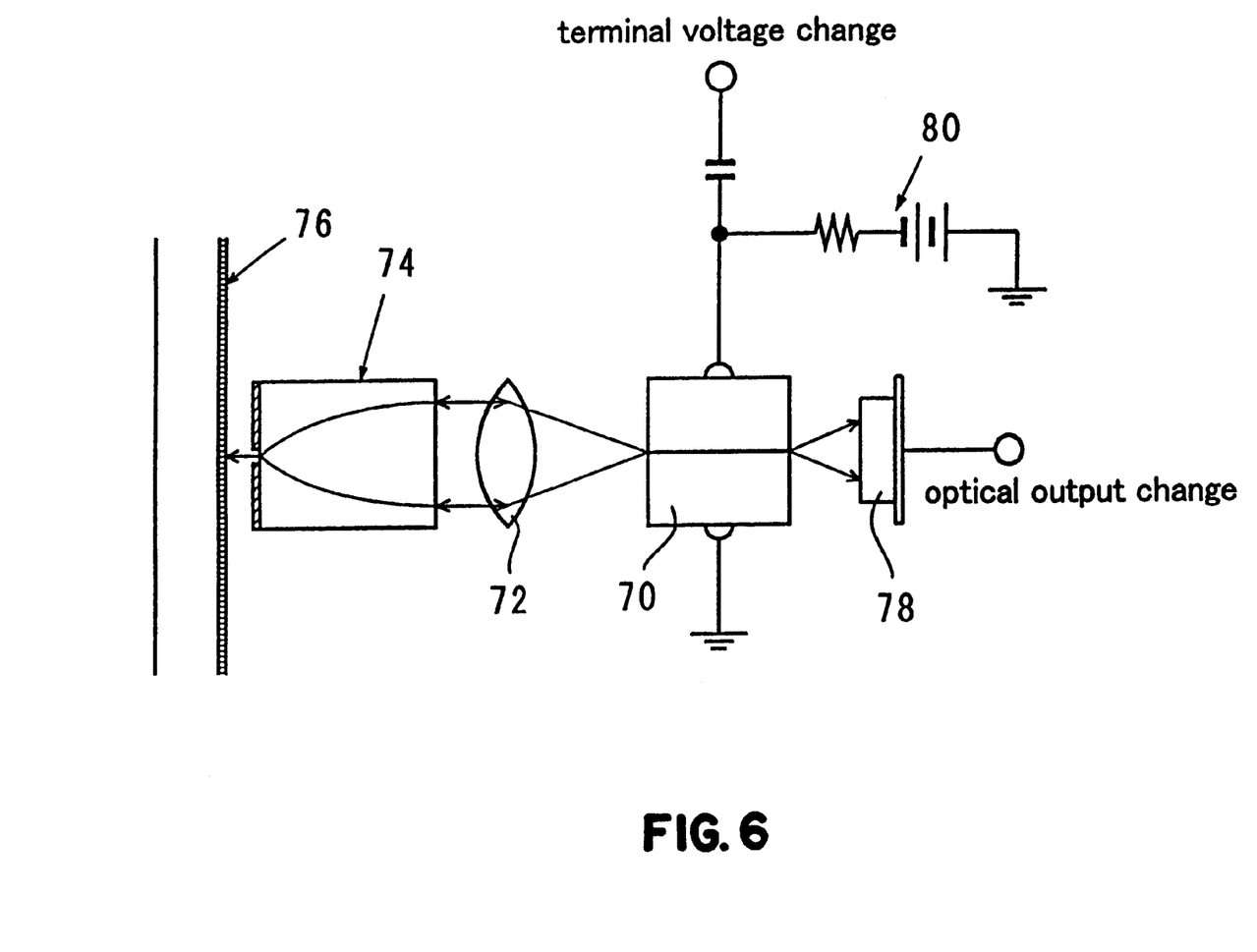
FIG. 6 is a diagram illustrating an example of an optical pickup using an optical probe in accordance with the present invention.

FIG. 6 illustrates an example of how an optical probe in accordance with the present invention can be applied to an optical pickup using the self-coupling effect of a semiconductor laser (see JP Patent No. 2543674). A semiconductor laser 70 having two end faces generates laser light, which is emitted from one end face. A collimator lens 72 collimates the laser light, which enters an optical probe 74. Evanescent light generated by the optical probe 74 interacts with an optical recording medium 76, and its light intensity is modulated according to the information stored in the optical recording medium. The modulated light returns into the optical system and is coupled into the semiconductor laser. Even when the intensity of the returning light is only about $1/1000$–$1/10000$ of the originally output light intensity, it is amplified when it returns into the semiconductor laser, and a slight change of the intensity of the returning light can cause a large change in the output of that semiconductor laser. This is called the self-coupling effect of semiconductor lasers. The change in the output of the semiconductor laser due to the returning light can be detected with a photodetector 78 arranged on the side of the semiconductor laser 70 that is opposite to the side on which the collimating lens 72 is located, or by driving the semiconductor laser with a constant current source 80 and detecting the voltage change at the terminals of the semiconductor laser. In other words, while the semiconductor laser is a light source, due to the self-coupling effect of the semiconductor laser, it is also an amplifier or a signal change detector for returning light. Generally speaking, the optical signal from the micro-aperture is very weak, so that it has to be amplified in some manner, and to use the self-coupling effect of the semiconductor laser is a very convenient way to do so.

The semiconductor laser should be spatially coherent (ideally being able to focus on a small focussing spot), and temporally incoherent (the returning light does not cause mode hopping of the semiconductor laser, i.e. longitudinal multi-mode, preferably with a sufficiently broad self-oscillation spectrum (>0.03 nm)). Such semiconductor lasers are currently under active research and development, and the present invention will become even more useful with improvements of such semiconductor lasers.

An optical probe in accordance with the present invention includes an evanescent light generating portion made of a light-blocking film provided with a micro-aperture, provided at the surface of a microlens. Thus, transmitted and focused light reaches the micro-aperture directly, so that the efficiency with which evanescent light is generated can be increased. Moreover, using as the optical probe of the present invention a microlens whose diameter is at least 40 times and whose area is at least 1600 times of that of the core portions of an optical fiber, the coupled energy can be increased. Thus, if the optical probe of the present invention is used for an optical recording device, optical energy can be coupled easily, and the coupled optical energy can be made very large, so that recording and reproduction are possible at very fast relative speeds between the recording medium and the optical pickup. In other words, the data transfer speed for recording and reproduction can be accelerated, improving the effectiveness of the optical recording device.

Moreover, the diameter of the optical probe of the present invention on the side where the laser light is incident is much larger than in optical probes in which a tapered through hole is formed directly in the slider, so that high-power laser light can be introduced easily, optical energy is transmitted and focused, and there are no losses due to optical absorption, which increases the efficiency with which energy is used.

Moreover, since the optical probe of the present invention principally uses a microlens, its positioning control is easier than that of an optical fiber probe. That is to say, since the optical probe of the present invention uses a microlens, which is a stiff component with a diameter of, for example, about 200 μm, its assembly, for example considering to the control of its positioning, is much easier than that of an optical fiber probe. Also considering the mounting on a slider, the practical usefulness of the optical probe of the present invention is very high.

In the optical probe of the present invention, a light-blocking film is deposited on one face of a microlens, and a micro-aperture is formed in alignment with the optical axis in the center of this light-blocking film. To form a micro-aperture with not more than 200 nm diameter precisely in the center of a microlens with for example 200 μm diameter, or even more strictly on the optical axis of the microlens is generally very difficult. However, with the method for manufacturing an optical probe in accordance with the present invention, the fact that the micro-aperture is formed in a microlens is utilized, and laser light is irradiated to dissolve, evaporate, or ablate a central portion of the light-blocking film, so that the aperture is formed automatically on the optical axis, and positioning is achieved without any further procedures, which is very useful for increasing productivity.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical probe comprising:
   a rod-shaped microlens having first and second end faces, which is provided with a refractive index distribution in a radial direction; and
   an evanescent light generating portion formed on the first end face of said microlens;
   wherein the refractive index distribution and the length of said microlens are such that parallel light that enters said microlens through the second end face converges while being transmitted through said microlens, and substantially focuses on the first end face;
   said evanescent light generating portion comprises a light-blocking film deposited on said first end face, which is provided with a micro-aperture formed substantially on an optical axis of said microlens;
   an aperture diameter of the micro-aperture is dimensioned such that the light transmitted through the microlens is leaked from said microlens substantially as evanescent light; and
   outside said micro-aperture, the light transmitted through the microlens is reflected or absorbed by said light-blocking film.

2. The optical probe according to claim 1, wherein said light-blocking film is selected from the group consisting of metal films, alloy films, metal-carbon films, and dielectric multi-layer films, and has a film thickness between 20 nm and 50 nm.

3. The optical probe according to claim 1, wherein said aperture diameter of said micro-aperture is not more than half the wavelength of said parallel light.

4. An optical probe comprising:
   a planar microlens having first and second surfaces, which comprises a lens portion provided at a surface of a transparent substrate, the lens portion having a substantially semi-circular cross-section; and
   an evanescent light generating portion formed on the first surface of the planar microlens;
   wherein the lens portion and the substrate thickness of said planar microlens are such that parallel light that enters said transparent substrate from the second surface converges while being transmitted through said microlens, and substantially focuses on the first surface;
   said evanescent light generating portion comprises a light-blocking film deposited a substrate surface, which is provided with a micro-aperture formed substantially on an optical axis of said microlens;
   an aperture diameter of the micro-aperture is such that the light transmitted through the microlens is leaked from said microlens substantially as evanescent light; and
   outside said micro-aperture, the converging transmitted light is reflected or absorbed by said light-blocking film.

5. The optical probe according to claim 4, wherein the planar microlens has a plurality of lens portions formed at a surface of said transparent substrate, and micro-apertures formed substantially on the optical axis of the lens portions.

6. The optical probe according to claim 4, wherein said light-blocking film is selected from the group consisting of metal films, alloy films, metal-carbon films, and dielectric multi-layer films, and has a film thickness between 20 nm and 50 nm.

7. The optical probe according to claim 4, wherein said aperture diameter of said micro-aperture is not more than half the wavelength of said parallel light.

8. A method for manufacturing an optical probe, comprising:
   forming a light-blocking film on a first end face of a microlens; and
   irradiating high-power laser light through a second end face of the microlens so as to eliminate a portion of said light-blocking film on an optical axis of the microlens with the light transmitted through the microlens, thereby producing a micro-aperture in the light-blocking film substantially on the optical axis of the microlens.

9. A method for manufacturing an optical probe, comprising:

forming a light-blocking film on a first end face of a microlens;

irradiating laser light from a second end face of the microlens so as to heat a portion of the light-blocking film substantially on an optical axis of the microlens with the light transmitted through the microlens, while irradiating at least one focused beam selected from a laser light beam and an ion beam on the light-blocking film substantially on the optical axis of the microlens from outside the microlens; and producing a micro-aperture in the light-blocking film substantially on the optical axis of the microlens by eliminating the light-blocking film with the combined effect of the laser light energy from inside the microlens and the focused beam energy from outside the microlens.

10. An optical head for an optical recording and reproduction device using evanescent light coupling, comprising an optical probe comprising a rod-shaped microlens having first and second end faces, which is provided with a refractive index distribution in a radial direction; and an evanescent light generating portion formed on the first end face of said microlens; wherein the refractive index distribution and the length of said microlens are such that parallel light that enters said microlens through the second end face converges while being transmitted through said microlens, and substantially focuses on the first end face;

said evanescent light generating portion comprises a light-blocking film deposited on said first end face, which is provided with a micro-aperture formed substantially on an optical axis of said microlens;

an aperture diameter of the micro-aperture is dimensioned such that the light transmitted through the microlens is leaked from said microlens substantially as evanescent light;

outside said micro-aperture, the light transmitted through the microlens is reflected or absorbed by said light-blocking film; and the optical probe is mounted on a slider floating over a recording medium, so that a floating face of the slider and said light-blocking film are substantially coplanar.

11. The optical head of claim 10, wherein a plurality of optical probes are lined up in said slider, spaced apart by integer multiples of the track pitch with respect to the direction of the rotation radius of the slider.

12. An optical head for an optical recording and reproduction device using evanescent light coupling, comprising an optical probe comprising a planar microlens having first and second surfaces, which comprises a lens portion provided at a surface of a transparent substrate, the lens portion having a substantially semi-circular cross-section; and an evanescent light generating portion formed on the first surface of the planar microlens;

the refractive index distribution and the substrate thickness of said planar microlens being such that parallel light that enters said transparent substrate from the second surface converges while being transmitted through said microlens, and substantially focuses on the first surface;

said evanescent light generating portion comprising a light-blocking film deposited a substrate surface, which is provided with a micro-aperture formed substantially on an optical axis of said microlens;

an aperture diameter of the micro-aperture being such that the light transmitted through the microlens is leaked from said microlens substantially as evanescent light;

outside said micro-aperture, the light transmitted through the microlens being reflected or absorbed by said light-blocking film; and the optical probe being mounted on a slider floating over a recording medium, so that a floating face of the slider and said light-blocking film are substantially coplanar.

13. The optical head of claim 12, wherein a plurality of optical probes are lined up in said slider, spaced apart by integer multiples of a track pitch with respect to the direction of the rotation radius of the slider.

14. An optical pickup using a self-coupling effect of a semiconductor laser, wherein laser light emitted from one end face of a semiconductor laser having two end faces is focused on an optical recording medium, and laser light that is reflected from the optical recording medium returns into the semiconductor laser through the emitting end face; the optical pickup comprising an optical probe opposing the optical recording medium, the optical probe comprising a rod-shaped microlens having first and second end faces, which is provided with a refractive index distribution in a radial direction; and an evanescent light generating portion formed on the first end face of said microlens; wherein the refractive index distribution and the length of said microlens are such that parallel light that enters said microlens through the second end face converges while being transmitted through said microlens, and substantially focuses on the first end face;

said evanescent light generating portion comprises a light-blocking film deposited on said first end face, which is provided with a micro-aperture formed substantially on an optical axis of said microlens;

an aperture diameter of the micro-aperture is dimensioned such that the light transmitted through the microlens is leaked from said microlens substantially as evanescent light; and outside said micro-aperture, the light transmitted through the microlens is reflected or absorbed by said light-blocking film.

15. An optical pickup using a self-coupling effect of a semiconductor laser, wherein laser light emitted from one end face of a semiconductor laser having two end faces is focused on an optical recording medium, and laser light that is reflected from the optical recording medium returns into the semiconductor laser through the emitting end face; the optical pickup comprising an optical probe opposing the optical recording medium, the optical probe comprising a planar microlens having first and second surfaces, which comprises a lens portion provided at a surface of a transparent substrate, the lens portion having a substantially semi-circular cross-section; and an evanescent light generating portion formed on the first surface of the planar microlens; wherein the lens portion and the substrate thickness of said planar microlens are such that parallel light that enters said transparent substrate from the second surface converges while being transmitted through said microlens, and substantially focuses on the first surface;

said evanescent light generating portion comprises a light-blocking film deposited a substrate surface, which is provided with a micro-aperture formed substantially on an optical axis of said microlens;

an aperture diameter of the micro-aperture is such that the light transmitted through the microlens is leaked from said microlens substantially as evanescent light; and outside said micro-aperture, the converging transmitted light is reflected or absorbed by said light-blocking film.

\* \* \* \* \*